United States Patent [19]
Haynes

[11] Patent Number: 5,558,485
[45] Date of Patent: Sep. 24, 1996

[54] LIFT AND DUMP APPARATUS

[76] Inventor: Terry Haynes, P.O. Box 20776, Beaumont, Tex. 77720-0776

[21] Appl. No.: 392,140

[22] Filed: Feb. 22, 1995

[51] Int. Cl.⁶ .................................................. B65G 65/23
[52] U.S. Cl. .......................................... 414/421; 414/425
[58] Field of Search .................................. 414/419, 420, 414/421, 425, 546; 298/11

[56] References Cited

U.S. PATENT DOCUMENTS

| | | | |
|---|---|---|---|
| 1,963,217 | 6/1934 | Van Horn et al. | 414/421 X |
| 2,781,929 | 2/1957 | Uhrich | 414/421 |
| 2,874,860 | 2/1959 | King | 414/419 X |
| 3,732,997 | 5/1973 | Reavis et al. | |
| 3,750,810 | 8/1973 | Stanfill | 414/421 |
| 4,580,940 | 4/1986 | Sheaver | 414/406 |
| 4,802,810 | 2/1989 | Gunn | 414/421 X |
| 5,006,031 | 4/1991 | Fossing et al. | 414/458 |
| 5,275,662 | 1/1994 | Wendler et al. | 414/421 X |
| 5,302,073 | 4/1994 | Riemersma et al. | 414/421 |
| 5,425,614 | 6/1995 | Perussi et al. | |

FOREIGN PATENT DOCUMENTS

| | | | |
|---|---|---|---|
| 278471 | 5/1990 | Germany | 414/419 |
| 0040147 | 3/1980 | Japan | 414/421 |
| 188397 | 7/1990 | Japan | 414/425 |
| 8301397 | 11/1984 | Netherlands | 414/421 |

OTHER PUBLICATIONS

Westerwalder Eisenwerk, Kippcon "Tipping and Handling unit" brochure, 4 pages, Jan. 1980.

Primary Examiner—Karen B. Merritt
Assistant Examiner—Stephen Gordon
Attorney, Agent, or Firm—Michael I. Kroll

[57] ABSTRACT

A lift and dump apparatus comprising a dumper unit for holding articles therein. A stable frame unit is also provided. A facility is for pivotally connecting the dumper unit to the stable frame unit. An assembly is for lifting the dumper unit, so that the dumper unit can go from an upright position to a tipped over position on the stable frame unit, to discharge all the articles therefrom. A structure on the stable frame unit is for transporting the dumper unit along a horizontal floor surface to and from a conveyor belt, to receive the articles when the dumper unit goes into the tipped over position.

8 Claims, 3 Drawing Sheets

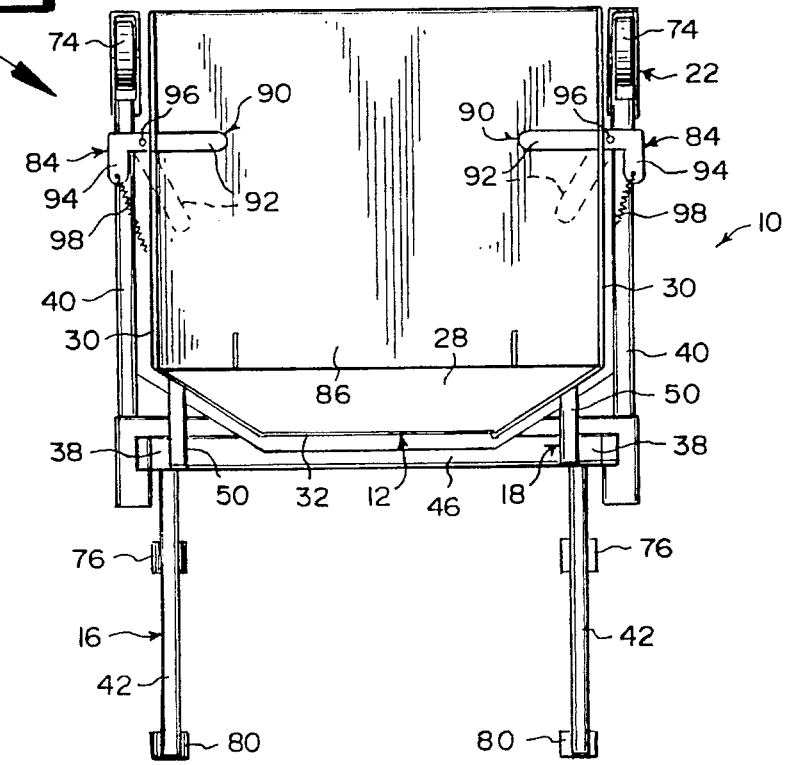
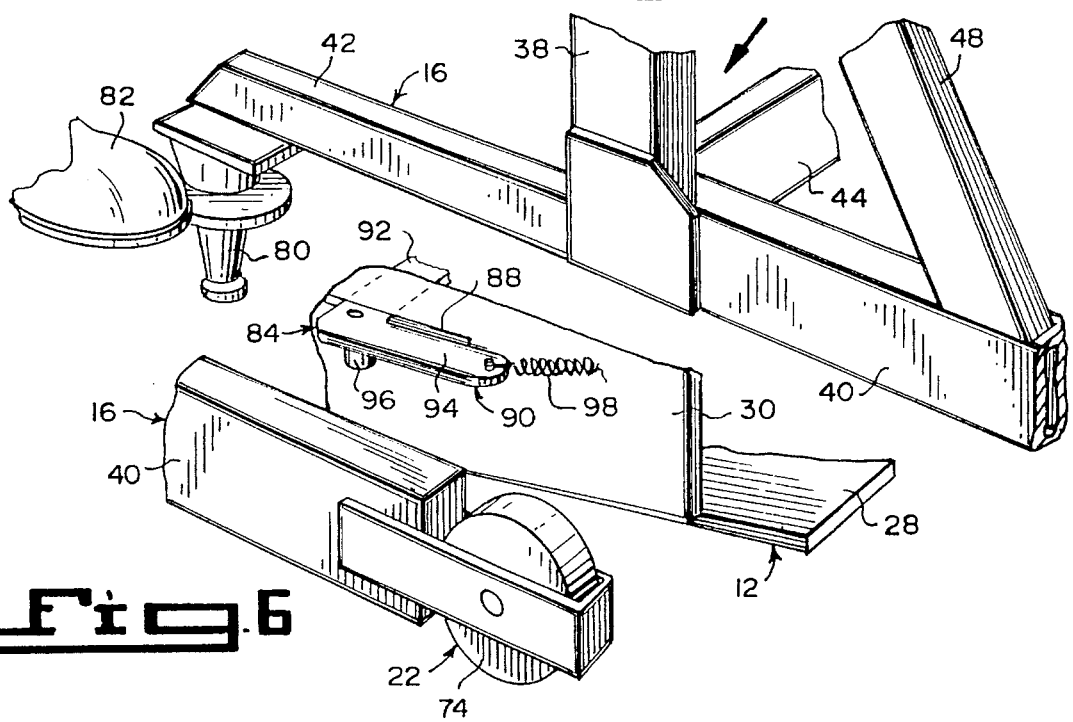

LIFT AND DUMP APPARATUS

BACKGROUND OF THE INVENTION

1. Field of the Invention

The instant invention relates generally to receptacle elevating devices and more specifically it relates to a lift and dump apparatus.

2. Description of the Prior Art

Numerous receptacle elevating devices have been provided in prior art. For example, U.S. Pat. Nos. 3,732,997 to Reavis et al.; 4,580,940 to Sheaves and 5,006,031 to Fossing et al. all are illustrative of such prior art. While these units may be suitable for the particular purpose to which they address, they would not be as suitable for the purposes of the present invention as heretofore described.

REAVIS, ROBERT P.

REAVIS, ROBERT P. JR.

REAVIS, ROBERT P. III

CONTAINER LIFT AND DUMP APPARATUS

U.S. Pat. No. 3,732,997

An apparatus is provided for lifting a container and dumping its contents into a receptacle such as a truck body. The apparatus has a horizontal fulcrum mounted on the outside of the receptacle. An elongated frame is swingable about the fulcrum between a lowered and a raised position. Endless chains on the frame have drive sprockets coaxial with the fulcrum. Hooks on the chains engage the container to first lift the same while the frame remains in its lowered position. In the lifted position of the container the hooks cooperate with abutments on the frame so that continued movement of the chains swings the frame with the container to a raised position in which contents of the container are dumped into the receptacle.

SHEAVES, JAMES R.

REFUSE CONTAINER LIFT/DUMP APPARATUS

U.S. Pat. No. 4,580,940

A dumping mechanism for lifting, rotating and dumping a waste receptacle of the type having a pair of vertically-spaced upper and lower support bars embodies an upwardly-rotatable face plate having an upper hook for engaging the upper bar of the waste receptacle. A latch member is slideably mounted on the rear of the face plate with a lower hook for engaging the lower bar of the waste receptacle. A lever arm is linked to the latch member and has one end pivotally mounted on the back of the face plate and an opposite end with a roller for engaging a fixed cam. A hydraulic motor supported between side plates is appended to and extends rearwardly from the face plate and is arranged for rotating the side plates and in turn the face plate about the motor shaft axis. A means is for energizing the hydraulic motor such that the face plate can lift, rotate and dump the container and then return the dumped container to a ground position. The lower hook engages the receptacle during the dumping operation and disengages the lower bar when in the ground position.

FOSSING, MICHAEL

JENSEN, BENT T.

ELEVATING AND TRANSPORTING DEVICE

U.S. Pat. No. 5,006,031

A transporting and elevating device for containers has a carrying device attached to the upper part of a two-part carrying frame for the container. The parts of the carrying frame may be mutually displaced by internal hydraulic cylinders, which makes it possible for two devices placed along sides of a transport vehicle to reach up above a container resting on the platform of the vehicle and thereafter pull its lower part upwards to the level of the platform. Whereafter a carrying device like chains together with braces and push-rods makes it possible to elevate and lower the container.

SUMMARY OF THE INVENTION

A primary object of the present invention is to provide a lift and dump apparatus that will overcome the shortcomings of the prior art devices.

Another object is to provide a lift and dump apparatus, which can be manually maneuvered into position adjacent a conveyor belt, so that a worker can unload articles therefrom hydraulically onto the conveyor belt.

An additional object is to provide a lift and dump apparatus, that will raise and discharge articles therefrom in a short period of time without any physical lifting on the part of the worker, thereby saving time.

A further object is to provide a lift and dump apparatus that is simple and easy to use.

A still further object is to provide a lift and dump apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 4 is a diagrammatic top view taken in the direction of arrow 4 in FIG. 3.

FIG. 5 is an enlarged perspective view of the area indicated by arrow 5 in FIG. 1, showing one floor lock in greater detail being depressed by a foot.

FIG. 6 is an enlarged perspective view of the area indicated by arrow 6 in FIG. 3, showing the front roller and the skid retainer in greater detail.

Similar reference characters denote corresponding features consistently throughout the attached drawings.

DETAILED DESCRIPTION OF THE PREFERRED EMBODIMENTS

Figure 1:
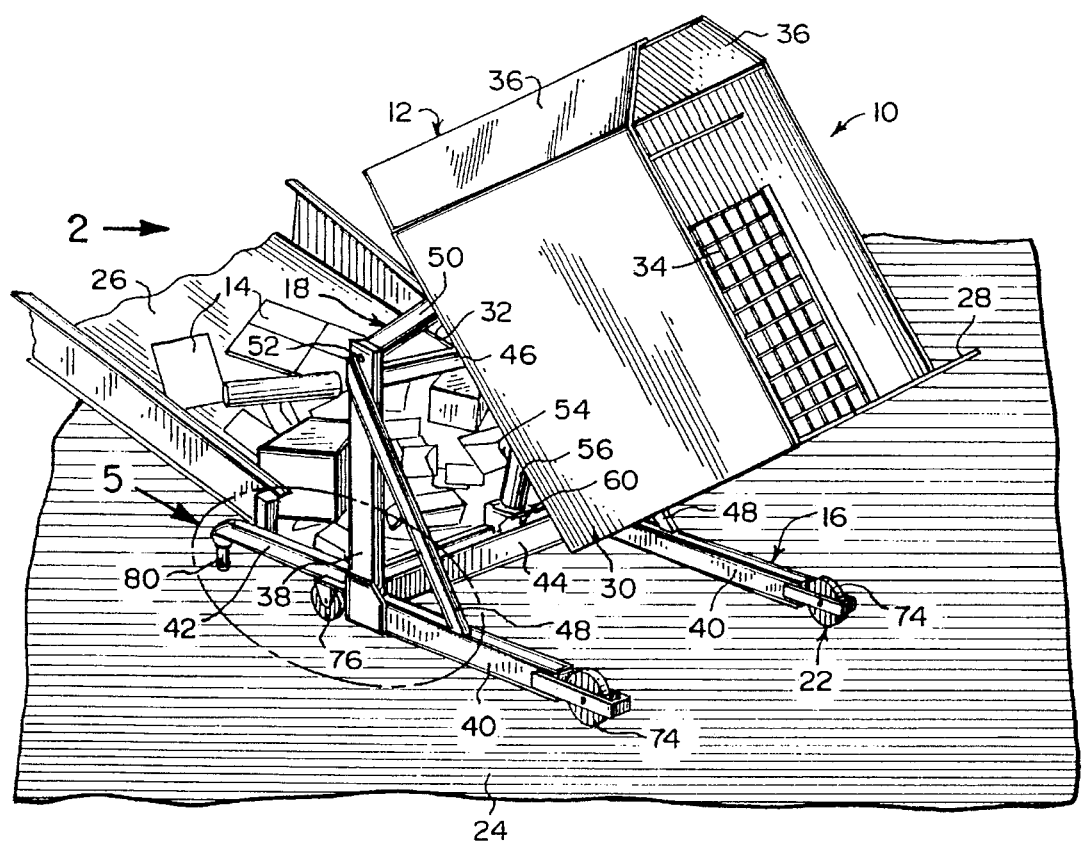
FIG. 1 is a diagrammatic front perspective view of the instant invention after unloading articles onto a conveyor belt.
Figure 2:
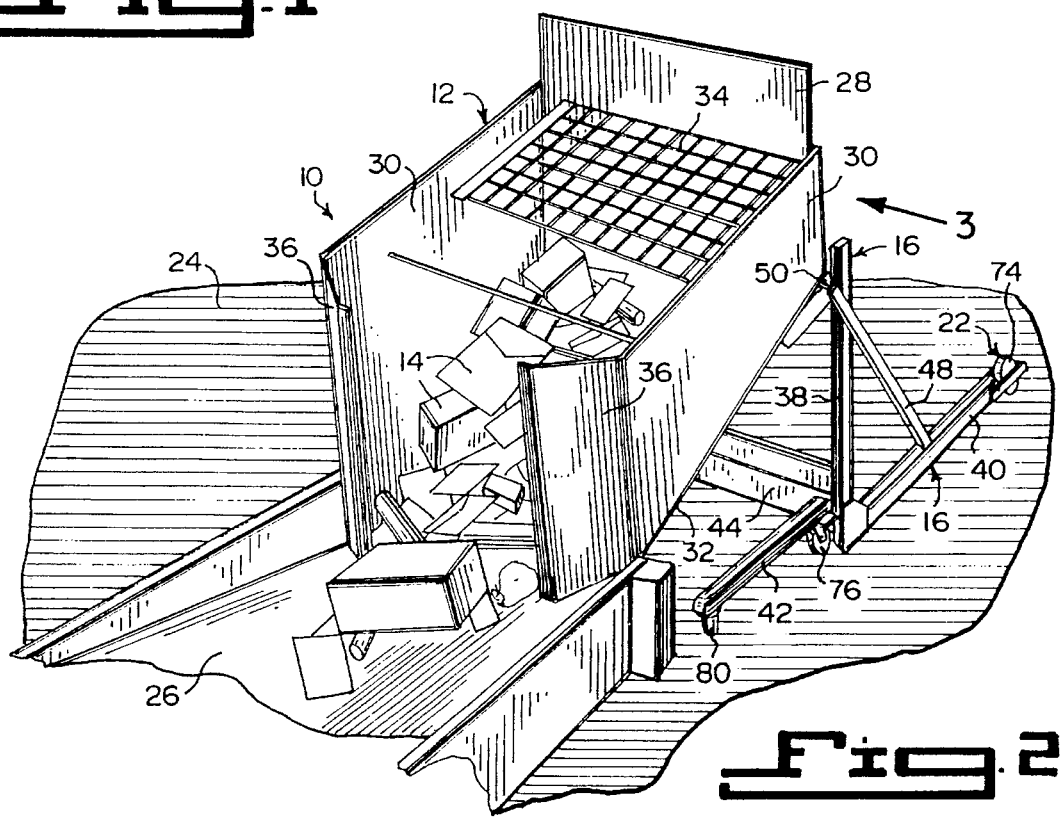
FIG. 2 is a diagrammatic rear perspective view taken in the direction of arrow 2 in FIG. 1, showing the instant invention unloading the articles onto the conveyor belt.
Figure 3:
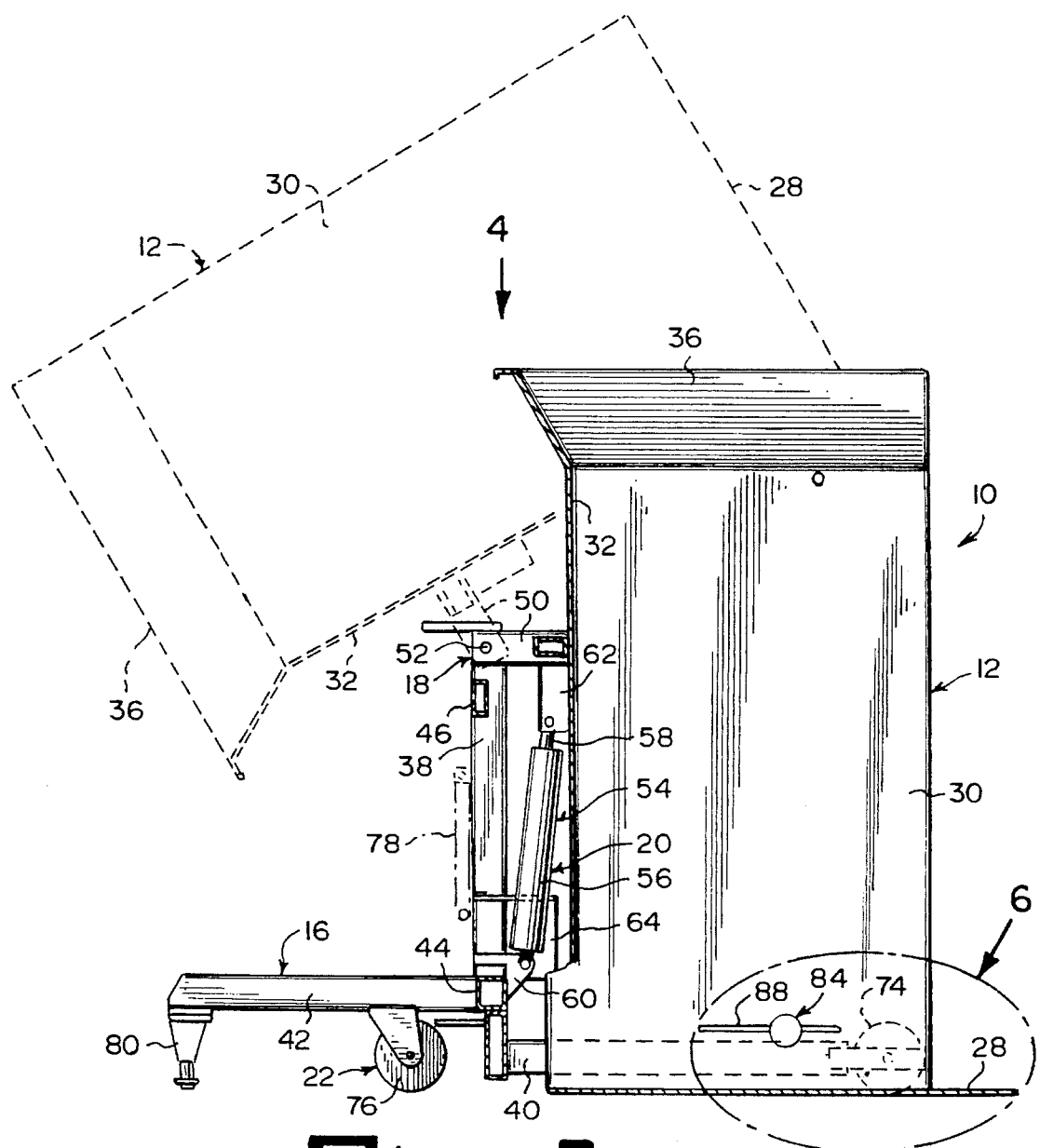
FIG. 3 is a diagrammatic side view taken in the direction of arrow 3 in FIG. 2, with parts broken away, in section, in phantom and in moved positions.
Figure 3A:
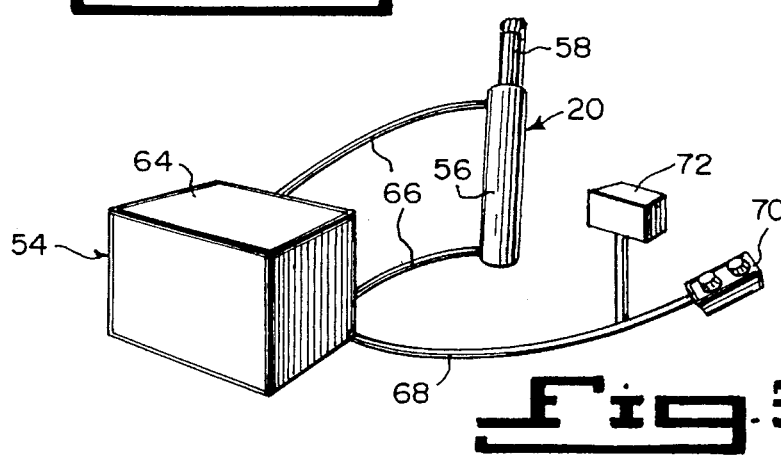
FIG. 3A is a perspective view of the hydraulic lift system.

Turning now descriptively to the drawings, in which similar reference characters denote similar elements throughout the several views, FIGS. 1 through 6 illustrate a lift and dump apparatus 10, comprising a dumper unit 12 for holding articles 14 therein. A stable frame unit 16 is also provided. A facility 18 is for pivotally connecting the dumper unit 12 to the stable frame unit 16. An assembly 20 is for lifting the dumper unit 12, so that the dumper unit 12 can go from an upright position to a tipped over position on the stable frame unit 16, to discharge all the articles 14 therefrom. A structure 22 on the stable frame unit 16 is for transporting the dumper unit 12 along a horizontal floor surface 24 to and from a conveyor belt 26, to receive the articles 14 when the dumper unit 12 goes into the tipped over position.

The dumper unit 12 consists of a platform 28. A pair of side walls 30 extend upwardly from the platform 28. A rear wall 32 extends upwardly from the platform 28. A removable grid holder 34 extends between the side walls 30 opposite from the rear wall 32. A pair of angle guide walls 36 are also provided. Each angle guide wall 36 extends from a top edge of one side wall 30, to direct the article 14 from the dumper unit 12 onto the conveyor belt 26, when in the tipped over position.

The stable frame unit 16 includes a pair of spaced apart parallel vertical supports 38. A pair of spaced apart parallel front horizontal base legs 40 extend from the vertical supports 38. A pair of spaced apart parallel rear horizontal base legs 42 extend from the vertical supports 38. A lower beam member 44 extends horizontally between the vertical supports 38. An upper beam member 46 extends horizontally between the vertical supports 38. A pair of struts 48 are also provided. Each strut 48 is angularly affixed between one vertical support 38 and one front horizontal base leg 40.

The pivotally connecting facility 18 comprises a pair of spaced apart parallel arms 50 extending from the rear wall 32 of the dumper unit 12. A pair of pivot pins 52 are also provided. Each pivot pin 52 extends through a top end of each vertical support 38 and through one arm 50, so that the arms 50 can pivot thereabout.

The lifting assembly 20 is a hydraulic lift system 54 carried upon the stable frame unit 16. The hydraulic lift system 54 includes a hydraulic cylinder 56, having a piston rod 58. A lower mount 60 connects a bottom end of the hydraulic cylinder 56 onto the lower beam member 44 of the stable frame unit 16. An upper mount 62 connects a top end of the piston rod 58 to the rear wall 32 of the dumper unit 12. A pump 64 is affixed onto the lower beam member 44 of the stable frame unit 16. A pair of hoses 66 extends between the pump 64 and the hydraulic cylinder 56. An electrical cord 68 has a first end connected to the pump 64. An up and down control switch 70 is connected to a second end of the electrical cord 68. A buzzer 72 is electrically connected into the electrical cord 68, which goes off automatically when the up and down control switch 70 is activated.

The transporting structure 22 consists of a pair of front rollers 74. Each front roller 74 is mounted onto a forward end of one front horizontal base leg 40. A pair of swivel casters 76 are provided. Each swivel caster 76 is mounted under one rear horizontal base leg 42 adjacent the connection to one vertical support 38. A handle 78 is pivotally attached to the pair of vertical supports 38. A person can lift up and grip the handle 78, to pull the stable frame unit 16 along the horizontal floor surface 24.

The transporting structure 22 further includes a pair of floor locks 80. Each floor lock 80 is mounted under one rear horizontal base leg 42 at its rearward end, so as to engage with the horizontal floor surface 24, when actuated by a foot 82 of the person.

The dumper unit 12 further contains a pair of spring biased closed skid retainer assemblies 84. Each skid retainer assembly 84 is mounted through one side wall 30. When the removable grid holder 34 is removed a skid 86 can be placed upon the platform 28 and held in place thereto by the skid retainer assemblies 84.

Each skid retainer assembly 84 consists of the side wall 30 of the dumper unit 12 having a longitudinal slot 88 adjacent the platform 28. An L-shaped bracket 90 is provided, having a long segment 92 and a short segments 94. A pivot pin housing 96 is affixed to the side wall 30 at the longitudinal slot 88 and extends through the L-shaped bracket 90. The long segment 92 will extend through the longitudinal slot 88. A spring 98 is attached between the short segment 94 of the L-shaped bracket 90 and the side wall 30, to normally bias the long segment 92 at a right angle into the dumper unit 12, so as to engage with the skid 86 on the platform 28.

LIST OF REFERENCE NUMBERS

| | |
|---|---|
| 10 | lift and dump apparatus |
| 12 | dumper unit |
| 14 | article |
| 16 | stable frame unit |
| 18 | pivotally connecting facility |
| 20 | lifting assembly |
| 22 | transporting structure |
| 24 | horizontal floor surface |
| 26 | conveyor belt |
| 28 | platform of 12 |
| 30 | side wall of 12 |
| 32 | rear wall of 12 |
| 34 | removable grid holder of 12 |
| 36 | angle guide wall of 12 |
| 38 | verticle support of 16 |
| 40 | front horizontal base leg of 16 |
| 42 | rear horizontal base leg of 16 |
| 44 | lower beam member of 16 |
| 46 | upper beam member of 16 |
| 48 | strut of 16 |
| 50 | arm of 18 |
| 52 | pivot pin of 18 |
| 54 | hydraulic lift system for 20 |
| 56 | hydraulic cylinder of 54 |
| 58 | piston rod of 56 |
| 60 | lower mount on 44 |
| 62 | upper mount on 32 |
| 64 | pump of 54 |
| 66 | hose of 54 |
| 68 | electrical cord of 54 |
| 70 | up and down control switch of 54 |
| 72 | buzzer of 54 |
| 74 | front roller of 22 on 40 |
| 76 | swivel caster of 22 on 42 |

| | |
|---|---|
| 78 | handle of 22 |
| 80 | floor lock of 22 on 42 |
| 82 | foot |
| 84 | skid retainer assemble |
| 86 | skid |
| 88 | longitudinal slot in 30 |
| 90 | L-shaped bracket |
| 92 | long segment of 90 |
| 94 | short segment of 90 |
| 96 | pivot pin housing |
| 98 | spring |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A lift and dump apparatus comprising:
    a) a dumper unit for holding articles therein, said dumper unit including a platform, a pair of side walls extending upwardly from said platform, a rear wall extending upwardly from said platform, a removable grid holder extending between said side walls opposite from said rear wall, and a pair of angle guide walls, each said angle guide wall extending from a top edge of one said side wall to direct the articles from said dumper unit onto the conveyor belt, when in the tipped over position;
    b) a stable frame unit, said stable frame unit including a pair of spaced apart parallel vertical supports, a pair of spaced apart parallel front horizontal base legs extending from said vertical supports, a pair of spaced apart parallel rear horizontal base legs extending from said vertical supports, a lower beam member extending horizontally between said vertical supports, an upper beam member extending horizontally between said vertical supports, and a pair of struts, each said strut angularly affixed between one said vertical support and one said front horizontal base leg;
    c) means for pivotally connecting said dumper unit to said stable frame unit;
    d) means for lifting said dumper unit, so that said dumper unit can go from an upright position to a tipped over position on said stable frame unit, to discharge all the articles therefrom; and
    e) means on said stable frame unit for transporting said dumper unit along a horizontal floor surface to and from a conveyor belt, to receive the articles when said dumper unit goes into the tipped over position.

2. A lift and dump apparatus as recited in claim 1, wherein said pivotally connecting means includes:
    a) a pair of spaced apart parallel arms extending from said rear wall of said dumper unit; and
    b) a pair of pivot pins, each said pivot pin extending through a top end of each said vertical support and through one said arm, so that said arms can pivot thereabout.

3. A lift and dump apparatus as recited in claim 2, wherein said lifting means is a hydraulic lift system carried upon said stable frame unit.

4. A lift and dump apparatus as recited in claim 3, wherein said hydraulic lift system includes:
    a) a hydraulic cylinder having a piston rod;
    b) a lower mount connecting a bottom end of said hydraulic cylinder onto said lower beam member of said stable frame unit;
    c) an upper mount connecting a top end of said piston rod to said rear wall of said dumper unit;
    d) a pump affixed onto said lower beam member of said stable frame unit;
    e) a pair of hoses extending between said pump and said hydraulic cylinder;
    f) an electrical cord having a first end connected to said pump;
    g) an up and down control switch connected to a second end of said electrical cord; and
    h) a buzzer electrically connected into said electrical cord, which goes off automatically when said up and down control switch is activated.

5. A lift and dump apparatus as recited in claim 4, wherein said transporting means includes:
    a) a pair of front rollers, each said front roller mounted onto a forward end of one said front horizontal base leg;
    b) a pair of swivel casters, each said swivel caster mounted under one said rear horizontal base leg adjacent the connection to one said vertical support; and
    c) a handle pivotally attached to said pair of Vertical supports, so that a person can lift up and grip said handle to pull said stable frame unit along the horizontal floor surface.

6. A lift and dump apparatus as recited in claim 5, wherein said transporting means further includes a pair of floor locks, each said floor lock mounted under one said rear horizontal base leg at its rearward end, so as to engage with the horizontal floor surface when actuated by a foot of the person.

7. A lift and dump apparatus as recited in claim 6, wherein said dumper unit further includes a pair of spring biased closed skid retainer assemblies, each said skid retainer assembly mounted through one said side wall, so that when said removable grid holder is removed a skid can be placed upon said platform and held in place thereto by said skid retainer assemblies.

8. A lift and ump apparatus as recited in claim 7, wherein each said skid retainer assembly includes:
    a) said side wall of said dumper unit having a longitudinal slot adjacent said platform;
    b) an L-shaped bracket having a long segment and a short segment;
    c) a pivot pin housing affixed to said side wall at said longitudinal slot and extending through said L-shaped bracket, so that said long segment will extend through said longitudinal slot; and
    d) a spring attached between said short segment of said L-shaped bracket and said side wall, to normally bias said long segment at a right angle into said dumper unit, so as to engage with the skid on said platform.

* * * * *